(12) United States Patent
Xiong

(10) Patent No.: US 9,661,478 B2
(45) Date of Patent: May 23, 2017

(54) METHOD AND APPARATUS FOR IMPLEMENTING TRUNKING GROUP CALL SERVICE

(71) Applicant: Huawei Technologies Co., Ltd., Shenzhen (CN)

(72) Inventor: Xin Xiong, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 196 days.

(21) Appl. No.: 14/323,963

(22) Filed: Jul. 3, 2014

(65) Prior Publication Data

US 2014/0323171 A1 Oct. 30, 2014

Related U.S. Application Data

(63) Continuation of application No. PCT/CN2012/086457, filed on Dec. 12, 2012.

(30) Foreign Application Priority Data

Jan. 5, 2012 (CN) .......................... 2012 1 0001585

(51) Int. Cl.
*H04W 4/10* (2009.01)
*H04W 72/14* (2009.01)
*H04W 72/00* (2009.01)

(52) U.S. Cl.
CPC ............ *H04W 4/10* (2013.01); *H04W 72/005* (2013.01); *H04W 72/14* (2013.01)

(58) Field of Classification Search
CPC ....... H04W 4/10; H04W 72/14; H04W 84/08; H04W 4/08; H04W 72/12; H04W 76/04;
(Continued)

(56) References Cited

U.S. PATENT DOCUMENTS

2008/0032699 A1 2/2008 Jang et al.
2009/0168732 A1 7/2009 Wiatrowski et al.
(Continued)

FOREIGN PATENT DOCUMENTS

CN 1984379 A 6/2007
CN 101321327 A 12/2008
(Continued)

OTHER PUBLICATIONS

Liu et al, CN101616364B, machine translated.*
(Continued)

*Primary Examiner* — Ping Hsieh
*Assistant Examiner* — James Yang
(74) *Attorney, Agent, or Firm* — Slater Matsil, LLP

(57) ABSTRACT

A method and an apparatus for implementing a group call service. A user equipment of the trunking group call service receives group configuration information and a downlink assignment message and/or an uplink grant message from an evolved cell. The user equipment saves the group configuration information and the downlink assignment message and/or the uplink grant message. If the user equipment is in a group receive state at different points of time, trunking group call service data is saved by sharing a downlink resource, indicated by the downlink assignment message, with another user equipment in the group in a semi-persistent scheduling manner according to the group configuration information.

20 Claims, 7 Drawing Sheets

(58) Field of Classification Search
CPC ..... H04W 72/00; H04W 8/26; H04W 74/002; H04W 12/10; H04W 76/028; H04L 1/0041
See application file for complete search history.

(56) References Cited

U.S. PATENT DOCUMENTS

| | | | | |
|---|---|---|---|---|
| 2011/0092236 A1* | 4/2011 | Iwamura | ............... | H04L 63/123 455/507 |
| 2011/0222501 A1* | 9/2011 | Kim | ...................... | H04L 1/0041 370/329 |
| 2012/0033623 A1* | 2/2012 | Chu | ...................... | H04W 76/02 370/329 |

FOREIGN PATENT DOCUMENTS

| | | | |
|---|---|---|---|
| CN | 101998643 A | | 3/2011 |
| EP | 2117243 A1 | * | 11/2009 |
| EP | 2117243 A1 | | 11/2009 |
| WO | 2011135555 A1 | | 11/2011 |

OTHER PUBLICATIONS

"Digital Cellular Telecommunications System (Phase 2+); Voice Group Call Service (VGCS); Stage 2 (3GPP TS 43.068 version 10.0.0 Release 10)," ETSI TS 143 068 V10.0.0, May 2011, 166 pages.

* cited by examiner

METHOD AND APPARATUS FOR IMPLEMENTING TRUNKING GROUP CALL SERVICE

This application is a continuation of International Application No. PCT/CN2012/086457, filed on Dec. 12, 2012, which claims priority to Chinese Patent Application No. 201210001585.X, filed on Jan. 5, 2012, both of which are hereby incorporated by reference in their entireties.

TECHNICAL FIELD

The present invention relates to the field of trunking communication technologies and, in particular embodiments, to a method and an apparatus for implementing a trunking group call service.

BACKGROUND

Trunking communication technologies are characterized by special features such as scheduling, group calling, and fast calls and, therefore, are widely used in the field of specialized communications.

A trunking group call service, which is a most fundamental service provided in the trunking communication technology, allows a user equipment to establish a group call to a group of user equipments in a given area, where the given area is referred to as a trunking group call area. In a process of implementing the trunking group call service, members with two types of identities are involved, namely, a scheduler and a user equipment that has subscribed to the trunking group call service. There may be no scheduler in a group. All user equipments in the group, except the scheduler, perform communication in a half-duplex manner. During a call, only one user equipment (a user equipment in a group-sending state) in the group talks at a time, and other user equipments (user equipments in a group receive state) listens passively. Each user equipment in the group may preempt a floor by pressing a PTT button (push to talk: push to talk) and get an opportunity to talk; other user equipments in the group can get the floor only after the user equipment that is granted the floor to talk releases the PTT button.

Each group has one unique group identification for implementing the trunking group call service. Any user equipment in the group may initiate a group call to the group. A user equipment in the group may initiate a group call of the group by inputting the group identification of the group and then pressing the PTT button, thereby implementing the trunking group call service. When the trunking group call service is implemented in a GSM network, two specific operating states are available:

a group receive state: a user equipment operates as a receiver of trunking group call service data, where a cell allocates no dedicated channel to the user equipment and the user equipment can only listen to group call information; and a group transmit state: the user equipment operates as a sender of the trunking group call service data, where the cell allocates, to the user equipment, two dedicated uplink channels, which are used to separately transmit data information and control information sent by the user equipment.

The development of an LTE system has resulted in a user requirement for implementing trunking communication in the LTE system, for example, implementing a trunking group call service in the LTE system. However, the LTE system has only a packet switched domain, where packet data is scheduled and transmitted by using a shared channel; therefore, in the LTE system, an evolved cell cannot allocate a dedicated channel for the trunking group call service. As a result, how to implement the trunking group call service in the LTE system becomes an important topic.

SUMMARY

Embodiments of the present invention provide a method and apparatus for implementing a trunking group call service, which can reduce an overhead of configuring an instruction caused because an evolved cell separately and repeatedly configures and schedules a resource for multiple user equipments in a same group, where the multiple user equipments are in a group transmit state and belong to the evolved cell, thereby improving resource utilization efficiency for the evolved cell.

In order to solve the foregoing technical problem, the present invention uses the following technical solutions:

A method for implementing a trunking group call service includes a user equipment of a trunking group call service receiving group configuration information and a downlink assignment message and/or an uplink grant message from an evolved cell. The user equipment saves the trunking group call service, the group configuration information and the downlink assignment message and/or the uplink grant message. If the user equipment of the trunking group call service is in a group receive state at different points of time, trunking group call service data is received by sharing a downlink resource, indicated by the downlink assignment message, with another user equipment in the group in a semi-persistent scheduling manner according to the group configuration information. Alternatively, or in addition, if the user equipment of the trunking group call service is in a group transmit state at different points of time, trunking group call service data is sent by using in turn, in a semi-persistent scheduling manner according to the group configuration information, an uplink resource indicated by the uplink grant message.

The present invention further provides a method for implementing a trunking group call service, including: configuring, by an evolved cell, group configuration information and a downlink assignment message and/or an uplink grant message for a user equipment of a trunking group call service in the evolved cell, where the downlink assignment message indicates a downlink resource that the user equipment, which is in a group receive state at different points of time, shares with another user equipment in the group in a semi-persistent scheduling manner, and the uplink grant message indicates an uplink resource that the user equipment, which is in a group transmit state at different points of time, and other user equipment in the group take turns to use in a semi-persistent scheduling manner; and sending, by the evolved cell, the group configuration information and the downlink assignment message and/or the uplink grant message to the user equipment of the trunking group call service.

Correspondingly, the present invention further provides an apparatus for implementing a trunking group call service, including: a receiving module, configured to receive group configuration information and a downlink assignment message and/or an uplink grant message from an evolved cell; a saving module, configured to save the group configuration information and the downlink assignment message and/or the uplink grant message received by the receiving module; a first processing module, configured to: when the apparatus is in a group receive state at different points of time, receive trunking group call service data by sharing a downlink resource, indicated by the downlink assignment message, with another user equipment in the group in a semi-persistent scheduling manner according to the group configuration information saved by the saving module; and/or a second processing module, configured to: when the apparatus is in a group transmit state at different points of time, send trunking group call service data in a manner in which the user equipment and another user equipment in the group take turns to use an uplink resource, indicated by the uplink grant message, in a semi-persistent scheduling manner according to the group configuration information saved by the saving module.

Correspondingly, the present invention further provides an apparatus for implementing a trunking group call service, including: a configuring module, adapted to configure group configuration information and a downlink assignment message and/or an uplink grant message for a user equipment of a trunking group call service in the evolved cell, where the downlink assignment message indicates a downlink resource that the user equipment, which is in a group receive state at different points of time, shares with another user equipment in the group in a semi-persistent scheduling manner, and the uplink grant message indicates an uplink resource that the user equipment, which is in a group transmit state at different points of time, and another user equipment in the group take turns to use in a semi-persistent scheduling manner; and a sending module, configured to send the group configuration information and the downlink assignment message and/or the uplink grant message configured by the configuring module to the user equipment of a trunking group call service.

Beneficial effects of the present invention are as follows.

When a trunking group call service is implemented, if a user equipment of a trunking group call service is in a group receive state at different points of time, the user equipment may share a downlink resource indicated by a downlink assignment message with another user equipment in the group in a semi-persistent scheduling manner according to group configuration information, and/or if a user equipment of a trunking group call service is in a group transmit state at different points of time, the user equipment and another user equipment in the group may take turns to use an uplink resource, indicated by an uplink grant message, in a semi-persistent scheduling manner according to group configuration information. Therefore, an evolved cell does not need to separately and repeatedly configure a downlink resource and/or an uplink resource for user equipments in a group, which reduces a resulting overhead of configuring an instruction and thereby improves resource utilization efficiency for the evolved cell.

BRIEF DESCRIPTION OF THE DRAWINGS

To illustrate the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
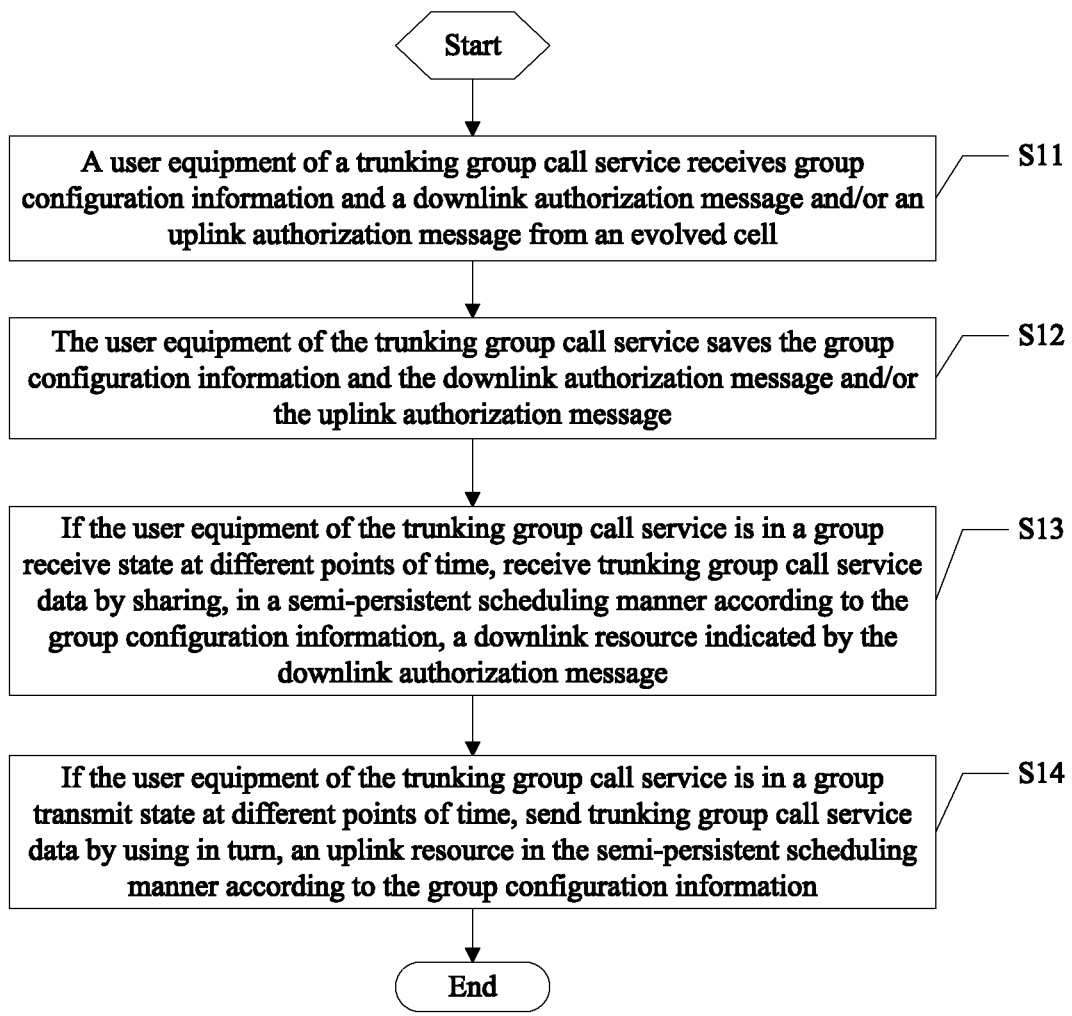
FIG. 1 is a schematic flowchart of a method for implementing a trunking group call service according to a first embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

With the development of trunking communication technologies, a user expects that a trunking group call service can be implemented in an LTE system. However, unlike a GSM network, an existing LTE system cannot allocate a dedicated channel to a UE (user equipment) for sending trunking group call service data; if the trunking group call service is implemented in a one-to-one full-duplex manner, resource utilization efficiency is low. Therefore, the present invention discloses a method and an apparatus for implementing the trunking group call service.

Some basic concepts involved in the embodiments of the present invention are described first in this part.

A semi-persistent scheduling manner is specifically a manner in which, in a transmission process of a resource scheduled in LTE, a user equipment sends or receives service data by using a same time-and-frequency resource at a fixed interval; therefore, an evolved cell does not need to configure a scheduled resource for the user equipment again. In other words, when the semi-persistent scheduling manner is used, by taking full advantage of the fact that arrival of a voice data packet at a user equipment is periodic, a scheduled resource required by a same user equipment needs to be configured only once and activated only once, and then can be used periodically.

A trunking group call service is a service in which a size of a data packet is relatively fixed and arrival of a data packet at a user equipment is somewhat periodic. According to the features of the trunking group call service, all user equipments in a group, except for a scheduler, communicate in a half-duplex manner, where only one user equipment has a floor at a time (a user equipment in a group transmit state has the floor), and multiple user equipments have no floor at a time (user equipments in a group receive state have no floor).

In the following, referring to FIG. 1 which is a flowchart of a method for implementing a trunking group call service according to a first embodiment of the present invention. The method includes the following steps.

Step S11: A user equipment of a trunking group call service receives group configuration information and a downlink assignment message and/or an uplink grant message from an evolved cell.

In a process of implementing the trunking group call service, multiple user equipments are involved. At a same time, one user equipment among the multiple user equipments is in a group transmit state, and all remaining user equipments are in a group receive state. In this embodiment of the present invention, the user equipment of the trunking group call service is any user equipment among the multiple user equipments.

The received group configuration information from the evolved cell includes: a semi-persistent scheduling period that indicates a time interval for receiving or sending trunking group call service data and a PCI (physical cell identifier) that is used to uniquely identify the evolved cell. Apparently, the group configuration information further includes a group cell radio network temporary identifier Group C-RNTI used for trunking group scheduling and some feedback information.

The received downlink assignment message and/or the uplink grant message, and/is used to indicate a downlink resource and/or an uplink resource.

Generally, the user equipment of the trunking group call service receives the group configuration information from the evolved cell first, and after saving the received group configuration information, receives the downlink assignment message and/or the uplink grant message from the evolved cell.

Step S12: The user equipment of the trunking group call service saves the group configuration information and the downlink assignment message and/or the uplink grant message.

Step S13: If the user equipment of the trunking group call service is in the group receive state at different points of time, the user equipment of the trunking group call service receives trunking group call service data by sharing the downlink resource, indicated by the downlink assignment message, with another user equipment in the group in a semi-persistent scheduling manner according to the group configuration information.

At a given point of time, the user equipment of the trunking group call service may be in the group receive state or in the group transmit state. A user equipment in the group receive state does not need to send trunking group call service data and only needs to passively receive trunking group call service data. Therefore, when the user equipment of the trunking group call service is in the group receive state, the user equipment in the group receive state may receive trunking group call service data according to the downlink resource indicated by the downlink assignment message.

At different points of time, the user equipment of the trunking group call service may be in the group transmit state or in the group receive state. At different points of time, when the user equipment of the trunking group call service is in the group receive state, the user equipment in the group receive state may receive trunking group call service data according to the downlink resource indicated by the downlink assignment message. For example, at a T1 time point, the user equipment of the trunking group call service is in the group receive state, and the user equipment of the trunking group call service receives trunking group call service data by using, in a semi-persistent scheduling manner, a downlink resource F1 indicated by a downlink assignment message. At a T3 time point, the user equipment of the trunking group call service is in the group receive state again, and the user equipment of the trunking group call service may still receive trunking group call service data by using, in the semi-persistent scheduling manner, the downlink resource F1 indicated by the downlink assignment message. In other words, as long as the user equipment of the trunking group call service is in the group receive state, the user equipment of the trunking group call service can receive trunking group call service data by using, in the semi-persistent scheduling manner, the downlink resource indicated by the downlink assignment message.

Because the user equipment of the trunking group call service is any user equipment in the process of implementing the trunking group call service, and because in the process of implementing the trunking group call service, user equipments in the group receive state may share the downlink resource at a same point of time, it may be understood that in the process of implementing the trunking group call service, all user equipments in the group receive state may share the downlink resource indicated by the downlink assignment message.

Step S14: If the user equipment of the trunking group call service is in a group transmit state at different points of time, the user equipment of the trunking group call service sends trunking group call service data in a manner in which the user equipment and another user equipment in the group take turns to use an uplink resource indicated by the uplink grant message, in a semi-persistent scheduling manner according to the group configuration information.

At a given point of time, the user equipment of the trunking group call service may be in the group transmit state or in the group receive state. When the user equipment of the trunking group call service is in the group transmit state, the user equipment in the group transmit state may send trunking group call service data by using the uplink resource, indicated by the uplink grant message, in the semi-persistent scheduling manner. At another point of time, if the user equipment of the trunking group call service is in the group transmit state again, the user equipment of the trunking group call service may still send trunking group call service data by using the uplink resource, indicated by the uplink grant message, in the semi-persistent scheduling manner. It may be understood that as long as the user equipment of the trunking group call service is in the group transmit state, the user equipment of the trunking group call service can send trunking group call service data by using the uplink resource, indicated by the uplink grant message, in the semi-persistent scheduling manner.

Because the user equipment of the trunking group call service is any user equipment in the process of implementing the trunking group call service, and because in the process of implementing the trunking group call service, it is possible that the user equipment in the group transmit state may be different at different points of time, the uplink resource indicated by the uplink grant message is used by user equipments in the group transmit state in turn.

In addition, it should be noted that in specific implementation, step S13 and step S14 may both be performed; or only step S13 or step S14 is performed. Moreover, no sequence is specified for performing step S13 and step S14.

In this embodiment, if a user equipment of a trunking group call service is in a group receive state at different points of time, the user equipment may share a downlink resource indicated by a downlink assignment message with another user equipment in the group in a semi-persistent scheduling manner according to group configuration information, and/or if a user equipment of a trunking group call service is in a group transmit state at different points of time, the user equipment and another user equipment in the group may take turns to use an uplink resource, indicated by an uplink grant message, in a semi-persistent scheduling manner according to group configuration information. Therefore, an evolved cell does not need to separately and repeatedly configure a downlink resource and/or an uplink resource for user equipments in a group, which reduces a resulting overhead of configuring an instruction and thereby improves resource utilization efficiency for the evolved cell.

Figure 2:
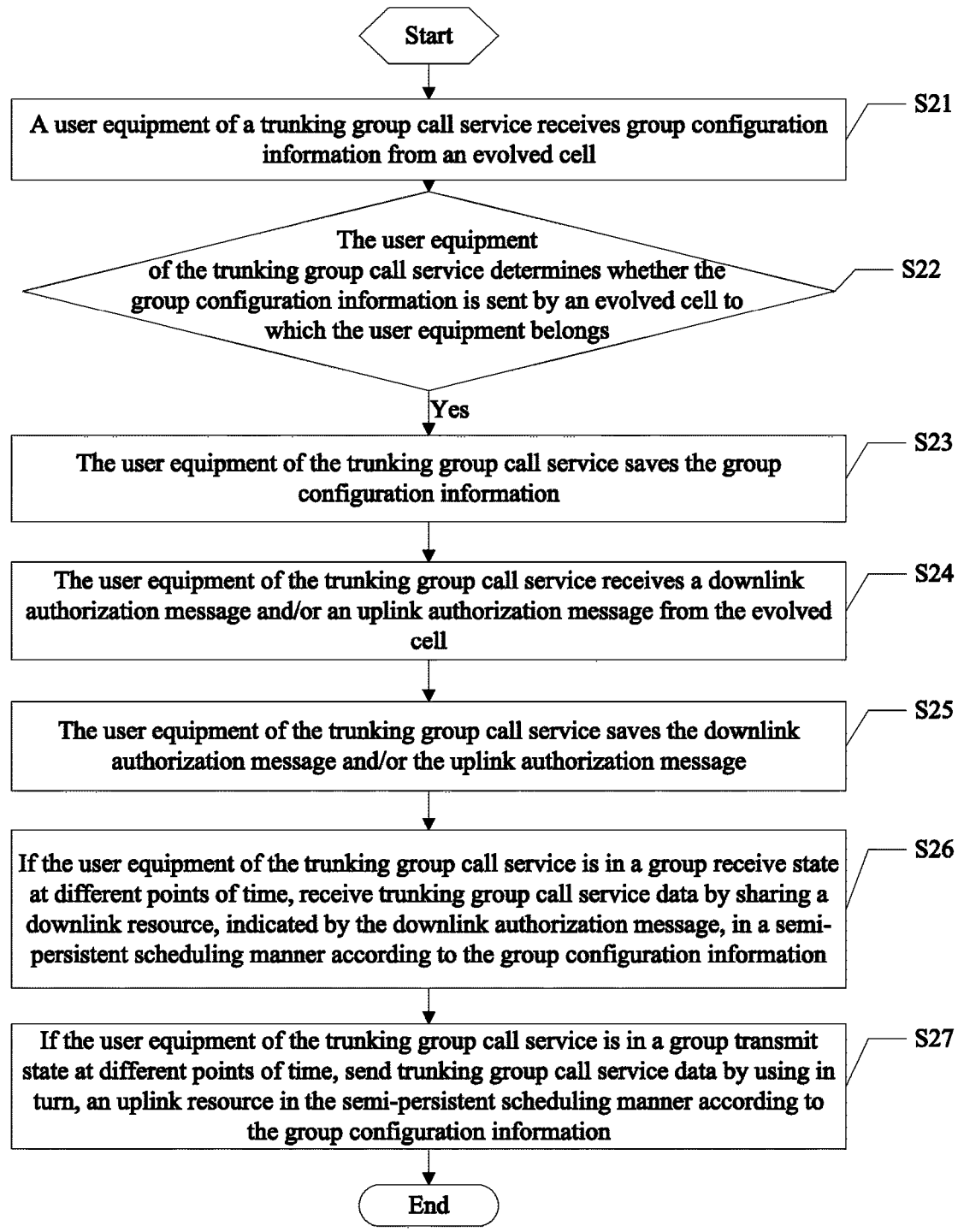
FIG. 2 is a schematic flowchart of a method for implementing a trunking group call service according to a second embodiment of the present invention.

FIG. 2 is a schematic flowchart of a method for implementing a trunking group call service according to a second embodiment of the present invention, where the method includes the following steps.

Step S21: A user equipment of a trunking group call service receives group configuration information from an evolved cell.

Step S22: The user equipment of the trunking group call service determines whether the group configuration information is sent by an evolved cell to which the user equipment of the trunking group call service belongs.

A reason why the user equipment of the trunking group call service needs to determine whether the group configuration information received is sent by the evolved cell to which the user equipment of the trunking group call service belongs is that: the user equipment of the trunking group call service can use only a downlink resource and/or an uplink resource indicated by the group configuration information sent by the evolved cell to which the user equipment of the trunking group call service belongs.

In specific implementation of this step, the user equipment of the trunking group call service may determine, in the following manner, whether the group configuration information is sent by the evolved cell to which the user equipment of the trunking group call service belongs:

In specific implementation, the determining, by the user equipment of the trunking group call service, whether the group configuration information is sent by an evolved cell to which the user equipment of the trunking group call service belongs includes determining, by the user equipment of the trunking group call service, whether a physical cell identifier PCI included in the received group configuration information matches a physical cell identifier PCI of the evolved cell to which the user equipment of the trunking group call service belongs; and if the physical cell identifiers match, determining that the group configuration information is sent by the evolved cell to which the user equipment of the trunking group call service belongs.

Step S23: The user equipment of the trunking group call service saves the group configuration information.

Step S24: The user equipment of the trunking group call service receives a downlink assignment message and/or an uplink grant message from the evolved cell.

Step S25: The user equipment of the trunking group call service saves the downlink assignment message and/or the uplink grant message.

Step S26: If the user equipment of the trunking group call service is in a group receive state at different points of time, receive trunking group call service data by sharing a downlink resource, indicated by the downlink assignment message, with another user equipment in the group in a semi-persistent scheduling manner according to the group configuration information.

Step S27: If the user equipment of the trunking group call service is in a group transmit state at different points of time, send trunking group call service data in a manner in which the user equipment and another user equipment in the group take turns to use an uplink resource, indicated by the uplink grant message, in a semi-persistent scheduling manner according to the group configuration information.

Operations in step S25 to step S27 are the same as operations in step S12 to step S14 in the embodiment illustrated in FIG. 1, and are not described here again.

Figure 3:
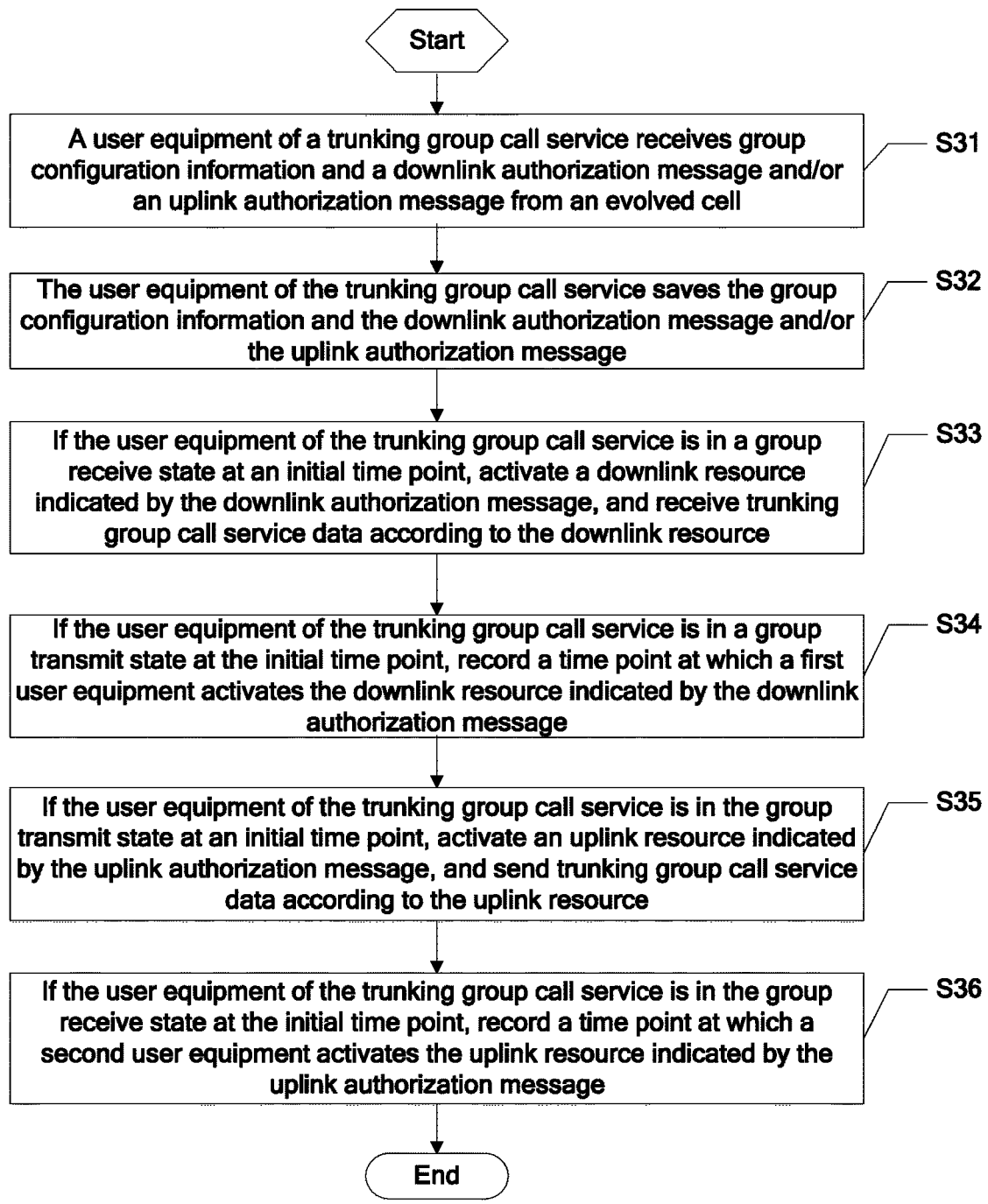
FIG. 3 is a schematic flowchart of a method for implementing a trunking group call service according to a third embodiment of the present invention.

Refer to FIG. 3 which is a schematic flowchart of a method for implementing a trunking group call service according to a third embodiment of the present invention, where the method includes the following:

Step S31: A user equipment of a trunking group call service receives group configuration information and a downlink assignment message and/or an uplink grant message from an evolved cell.

Step S32: The user equipment of the trunking group call service saves the group configuration information and the downlink assignment message and/or the uplink grant message.

Operations in step S31 to step S32 are the same as operations in step S11 to step S12 in the embodiment illustrated in FIG. 1, and are not described here again. It may be understood that before the group configuration information is saved, the method may further include an operation in which the user equipment of the trunking group call service determines whether the group configuration information received by the user equipment is sent by an evolved cell to which the user equipment of the trunking group call service belongs.

Step S33: If the user equipment of the trunking group call service is in a group receive state at an initial time point and then is in the group receive state at different points of time, the user equipment of the trunking group call service activates a downlink resource indicated by the downlink assignment message, and receives trunking group call service data according to the downlink resource.

The initial time point refers to a time point at which the user equipment of the trunking group call service receives the downlink resource from the evolved cell.

Specifically, the downlink assignment message sent by the evolved cell is physical downlink control channel PDCCH signaling that is scrambled by using a Group C-RNTI. After the downlink assignment message is received, an operation performed by the user equipment of the trunking group call service after the downlink assignment message is received varies according to a state of the user equipment of the trunking group call service.

At the initial time point, if the user equipment of the trunking group call service is in the group receive state, the user equipment of the trunking group call service activates the downlink resource indicated by the downlink assignment message, and receives trunking group call service data according to the downlink resource. Because the downlink assignment message may be the PDCCH signaling that is scrambled by using a Group C-RNTI in the group configuration information, the user equipment in the group receive state further needs to, before activating the downlink resource indicated by the downlink assignment message, descramble the PDCCH signaling by using the Group C-RNTI included in the group configuration information.

At the initial time point, if the user equipment of the trunking group call service is in a group transmit state, step S34 is performed.

Step S34: If the user equipment of the trunking group call service is in the group transmit state at the initial time point and then is in the group receive state at different points of time, record a time point at which a first user equipment activates the downlink resource indicated by the downlink assignment message, where the first user equipment is a user equipment in the group receive state in a process of implementing the trunking group call service.

If the user equipment of the trunking group call service is in the group transmit state at the initial time point, it indicates that another user equipment of the trunking group call service is in the group receive state at the initial time point and has performed the operation of activating the downlink resource indicated by the downlink assignment message, for example, the first user equipment is in the group receive state and has performed the operation of activating the downlink resource indicated by the downlink assignment message. Therefore, the user equipment of the trunking group call service needs to record the time point at which the first user equipment activates the downlink resource indicated by the downlink assignment message. Because the user equipment of the trunking group call service and the first user equipment belong to the same group, the user equipment of the trunking group call service can learn the time point at which the first user equipment activates the downlink resource.

It should be noted that in a subsequent process of implementing the trunking group call service, when the user equipment of the trunking group call service is in the group receive state at different points of time, the user equipment of the trunking group call service obtains a downlink receiving time according to a semi-persistent scheduling period and the recorded time point at which the downlink resource is activated, and receives trunking group call service data according to the saved downlink assignment message. For example, at the initial time point, the user equipment of the trunking group call service is in the group transmit state and records a T2 time point at which the downlink resource is activated; if the user equipment of the trunking group call service is in the group receive state after two semi-permanent periods, the user equipment of the trunking group call service determines, by performing calculation according to the semi-persistent scheduling period T and T2, that a downlink receiving time thereof is 2T+T2, and receives trunking group call service data according to the downlink resource indicated by the stored downlink assignment message.

It may be understood that if the user equipment of the trunking group call service is in the group receive state at the initial time point, before using the downlink resource, the user equipment of the trunking group call service needs to activate the downlink resource; if the user equipment of the trunking group call service is in the group transmit state at the initial time point, the time point at which another user equipment activates the downlink resource needs to be recorded. In subsequent implementation of the trunking group call service, if the user equipment of the trunking group call service is in the group receive state, the downlink resource does not need to be activated again. In other words, in the whole implementation process of the trunking group call service, the downlink resource needs to be activated only once; if the user equipment of the trunking group call service is in the group receive state, the downlink resource may be used periodically. Therefore, when the user equipment of the trunking group call service is in the group receive state at different points of time, the evolved cell does not need to send a downlink assignment message to the user equipment repeatedly, thereby further reducing an overhead for the evolved cell to configure an instruction, and further improving resource utilization efficiency for the evolved cell.

Operations in step S33 to step S34 are equivalent to operations in step S13 in the embodiment illustrated in FIG. 1.

Step S35: If the user equipment of the trunking group call service is in the group transmit state at an initial time point and then is in the group transmit state at different points of time, the user equipment of the trunking group call service activates the uplink resource indicated by the uplink grant message, and sends trunking group call service data according to the uplink resource.

The initial time point refers to a time point at which the user equipment of the trunking group call service receives the uplink resource from the evolved cell.

Specifically, the uplink grant message sent by the evolved cell may be PDCCH signaling that is scrambled by using a Group C-RNTI. After the uplink grant message is received, an operation performed by the user equipment of the trunking group call service after the uplink grant message is received varies according to a state of the user equipment of the trunking group call service.

At the initial time point, if the user equipment of the trunking group call service is in the group transmit state, the user equipment of the trunking group call service activates the uplink resource indicated by the uplink grant message, and sends trunking group call service data according to the uplink resource. Because the uplink grant message is the PDCCH signaling that is scrambled by using the Group C-RNTI, the user equipment in the group transmit state further needs to, before activating the uplink resource indicated by the uplink grant message, descramble the PDCCH signaling by using the Group C-RNTI included in the group configuration information.

At the initial time point, if the user equipment of the trunking group call service is in the group receive state, step S36 is performed.

Step S36: If the user equipment of the trunking group call service is in the group receive state at the initial time point and then is in the group transmit state at different points of time, record a time point at which a second user equipment activates the uplink resource indicated by the uplink grant message, where the second user equipment is a user equipment in the group transmit state in the process of implementing the trunking group call service.

If the user equipment of the trunking group call service is in the group receive state at the initial time point, it indicates that another user equipment of the trunking group call service is in the group transmit state at the initial time point and has performed the operation of activating the uplink resource indicated by the uplink grant message, for example, the second user equipment is in the group transmit state and has performed the operation of activating the uplink resource indicated by the uplink grant message. Therefore, the user equipment of the trunking group call service needs to record the time point at which the second user equipment activates the uplink resource indicated by the uplink grant message. Because the user equipment of the trunking group call service and the second user equipment belong to the same group, the user equipment of the trunking group call service can learn the time point at which the second user equipment activates the uplink resource.

It should be noted that in a subsequent process of implementing the trunking group call service, when the user equipment of the trunking group call service is in the group transmit state at different points of time, the user equipment of the trunking group call service obtains an uplink sending time according to the semi-persistent scheduling period and the recorded time point at which the uplink resource is activated, and sends trunking group call service data according to the uplink resource configuration information instruction. For example, at the initial time point, the user equipment of the trunking group call service is in the group receive state and records a T4 time point at which the uplink resource is activated; if the user equipment of the trunking group call service is in the group transmit state after two semi-permanent periods, the user equipment of the trunking group call service determines, by performing calculation according to the semi-persistent scheduling period T and T4, that an uplink sending time of the user equipment of the trunking group call service is 2T+T4, and sends trunking group call service data according to the uplink resource indicated by the saved uplink grant message.

It may be understood that if the user equipment of the trunking group call service is in the group transmit state at the initial time point, before using the uplink resource, the user equipment of the trunking group call service needs to activate the uplink resource; if the user equipment of the trunking group call service is in the group receive state at the initial time point, the time point at which another user equipment activates the uplink resource needs to be recorded. In subsequent implementation of the trunking group call service, if the user equipment of the trunking group call service is in the group transmit state, the uplink resource does not need to be activated again. In other words, in the whole implementation process of the trunking group call service, the uplink resource needs to be activated only once; if the user equipment of the trunking group call service is in the group transmit state, the uplink resource may be used periodically to send trunking group call service data. Therefore, when the user equipment of the trunking group call service is in the group transmit state at different points of time, the evolved cell does not need to send an uplink grant message to the user equipment of the trunking group call service repeatedly, thereby further reducing an overhead for the evolved cell to configure an instruction, and further improving resource utilization efficiency for the evolved cell.

Operations in step S35 to step S36 are equivalent to operations in step S14 in the embodiment illustrated in FIG. 1.

Figure 4:
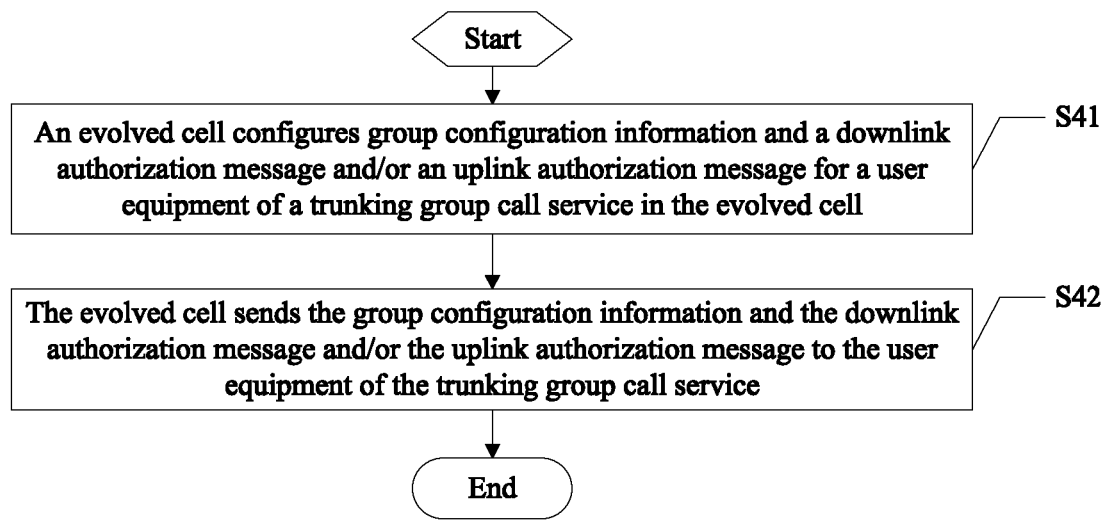
FIG. 4 is a schematic flowchart of a method for implementing a trunking group call service according to a fourth embodiment of the present invention.

Refer to FIG. 4 which is a schematic flowchart of a method for implementing a trunking group call service according to a fourth embodiment of the present invention, where the method includes the following:

Step S41: An evolved cell configures group configuration information and a downlink assignment message and/or an uplink grant message for a user equipment of a trunking group call service in the evolved cell, where the downlink assignment message indicates a downlink resource that the user equipment, which is in a group receive state at different points of time, shares with another user equipment in the group in a semi-persistent scheduling manner and the uplink grant message indicates an uplink resource that the user equipment, which is in a group transmit state at different points of time, and another user equipment in the group take turns to use in the semi-persistent scheduling manner.

The group configuration information configured by the evolved cell includes a semi-persistent scheduling period that indicates a time interval for receiving or sending trunking group call service data, a physical cell identifier for uniquely identifying the evolved cell, and a group cell radio network temporary identifier Group C-RNTI used for trunking group scheduling.

Step S42: The evolved cell sends the group configuration information and the downlink assignment message and/or the uplink grant message to the user equipment of the trunking group call service.

Generally, the evolved cell sends the group configuration information to the user equipment of the trunking group call service first, and after the user equipment of the trunking group call service receives the group configuration information, sends the downlink assignment message and/or the uplink grant message to the user equipment.

Specifically, the evolved cell sends, when sending the group configuration message to the user equipment of the trunking group call service, a trunking group call notification message in a form of a paging message or a form of a new common control message to the user equipment of the trunking group call service, where the trunking group call notification message carries the group configuration information.

For example, if an evolved cell cell A sends a trunking group call notification message in a form of a paging message, the trunking group call notification message becomes a paging message, where the paging message carries the group configuration information. The paging message is scrambled by using a paging-radio network temporary identifier P-RNTI. P-RNTIs of all user equipments of the trunking group call service are the same. Therefore, the user equipment of the trunking group call service can receive and save the group configuration information.

Apparently, the trunking group call notification message may also be a new common control message that is newly defined. For example, the cell A defines a new common control message, where the new common control message includes the group configuration information, and the cell A sends the new common control message. The new common control message may be scrambled by using another common radio network temporary identifier RNTI. All user equipments of the trunking group call service have the same RNTI. Therefore, the user equipment of the trunking group call service can receive and save the group configuration information.

In this embodiment, a downlink assignment message configured by an evolved cell indicates a downlink resource that is shared in a semi-persistent scheduling manner by user equipments of a trunking group call service in a group receive state, and/or a configured uplink grant message indicates an uplink resource that user equipments of a trunking group call service in a group transmit state take turns to use in a semi-persistent scheduling manner. Therefore, the evolved cell does not need to separately and repeatedly configure a downlink resource and/or an uplink resource for user equipments in a group, which reduces a resulting overhead of configuring an instruction and thereby improves resource utilization efficiency for the evolved cell.

Figure 5:
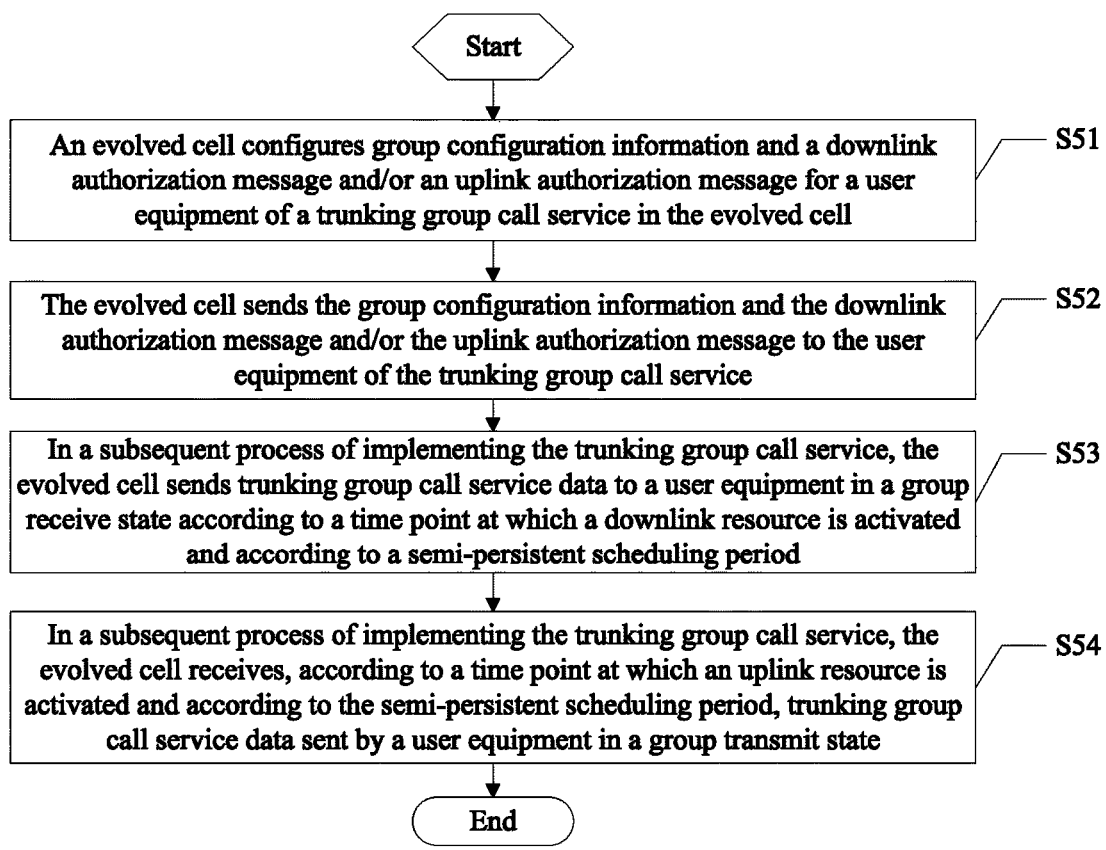
FIG. 5 is a schematic flowchart of a method for implementing a trunking group call service according to a fifth embodiment of the present invention.

Refer to FIG. 5 which is a schematic flowchart of a method for implementing a trunking group call service according to a fifth embodiment of the present invention, where the method includes the following steps.

Step S51: An evolved cell configures group configuration information and a downlink assignment message and/or an uplink grant message for a user equipment of a trunking group call service in the evolved cell, where the downlink assignment message indicates a downlink resource that the user equipment, which is in a group receive state at different points of time, shares with another user equipment in the group in a semi-persistent scheduling manner and the uplink grant message indicates an uplink resource that the user equipment, which is in a group transmit state at different points of time, and another user equipment in the group take turns to use in the semi-persistent scheduling manner.

Step S52: The evolved cell sends the group configuration information and the downlink assignment message and/or the uplink grant message to the user equipment of the trunking group call service.

Operations in step S51 to step S52 are the same as operations in step S41 to step S42 in the embodiment illustrated in FIG. 4, and are not described here again.

Step S53: In a subsequent process of implementing the trunking group call service, the evolved cell sends trunking group call service data to a user equipment in the group receive state according to a time point at which the downlink resource is activated and according to a semi-persistent scheduling period.

The time point at which the downlink resource is activated is a time point at which a user equipment that is in the group receive state at an initial time point activates the downlink resource. In the whole process of implementing the trunking group call service, the evolved cell sends the downlink assignment message only once, where the downlink assignment message is scrambled by using a group cell radio network temporary identifier Group C-RNTI that is used for performing trunking group scheduling and is in the group configuration information.

Specifically, the downlink assignment message may be PDCCH signaling that is scrambled by using the Group C-RNTI.

After the evolved cell sends the downlink assignment message to the user equipment of the trunking group call service, the user equipment in the group receive state at the initial time point activates the downlink resource indicated by the downlink assignment message, and receives a trunking group call service data according to the downlink resource. Because the downlink assignment message may be the PDCCH signaling that is scrambled by using the Group C-RNTI, the user equipment in the group receive state further needs to, before activating the downlink resource, descramble the PDCCH signaling by using the Group C-RNTI included in the group configuration information.

The initial time point specifically is a time point at which a user equipment of the trunking group call service receives the downlink assignment message. The time point at which the downlink resource is activated is a time point at which a user equipment that is in the group receive state at the initial time point activates the downlink resource.

Because user equipments of the trunking group call service perform resource scheduling in the semi-persistent scheduling manner, in the whole process of implementing the trunking group call service, the evolved cell sends the downlink assignment message to a user equipment of the trunking group call service only once. In a subsequent process of implementing the trunking group call service, the evolved cell sends trunking group call service data to a user equipment in the group receive state according to the time point at which the downlink resource is activated and according to the semi-persistent scheduling period. Therefore, the evolved cell does not need to separately and repeatedly send the downlink assignment message to a user equipment in the group receive state, which reduces an overhead for the evolved cell to configure an instruction, thereby further improving resource utilization efficiency for the evolved cell.

Step S54: In a subsequent process of implementing the trunking group call service, the evolved cell receives, according to a time point at which the uplink resource is activated and according to the semi-persistent scheduling period, trunking group call service data sent by a user equipment in a group transmit state.

The time point at which the uplink resource is activated is a time point at which a user equipment that is in the group transmit state at an initial time point activates the uplink resource. In the whole process of implementing the trunking group call service, the evolved cell sends the uplink grant message only once, where the uplink grant message is scrambled by using a group cell radio network temporary identifier Group C-RNTI that is used for performing trunking group scheduling and is in the group configuration information.

Specifically, the uplink grant message may be PDCCH signaling that is scrambled by using the Group C-RNTI.

After the evolved cell sends the uplink grant message to the user equipment of the trunking group call service, a user equipment in the group transmit state at an initial time point activates the uplink resource indicated by the uplink grant message, and sends a trunking group call service according to the uplink resource. Because the uplink grant message may be the PDCCH signaling that is scrambled by using the Group C-RNTI, the user equipment in the group transmit state further needs to, before activating the uplink resource, descramble the PDCCH signaling by using the Group C-RNTI included in the group configuration information.

The initial time point specifically is a time point at which a user equipment of the trunking group call service receives the uplink grant message. The time point at which the uplink resource is activated is a time point at which a user equipment that is in the group transmit state at the initial time point activates the uplink resource.

Because user equipments of the trunking group call service perform resource scheduling in the semi-persistent scheduling manner, in the whole process of implementing the trunking group call service, the evolved cell sends the uplink grant message to a user equipment of the trunking group call service only once. In a subsequent process of implementing the trunking group call service, the evolved cell receives trunking group call service data sent by a user equipment in the group transmit state according to the time point at which the uplink resource is activated and according to the semi-persistent scheduling period. Therefore, the evolved cell does not need to separately and repeatedly send the uplink grant message to a user equipment in the group transmit state, which reduces an overhead for the evolved cell to configure an instruction, thereby further improving resource utilization efficiency for the evolved cell.

It should be noted that after the evolved cell configures both the uplink grant message and the downlink assignment message for the user equipment of the trunking group call service, the evolved cell sends both the uplink grant message and the downlink assignment message to the user equipment of the trunking group call service. It may be understood that no sequence is specified for performing step S53 and step S54.

The methods for implementing a trunking group call service disclosed in the embodiments of the present invention are described in detail with reference to FIG. 1 to FIG. 5. The following describes an apparatus for implementing a trunking group call service by means of the foregoing methods with reference to FIG. 6 to FIG. 10.

Figure 6:
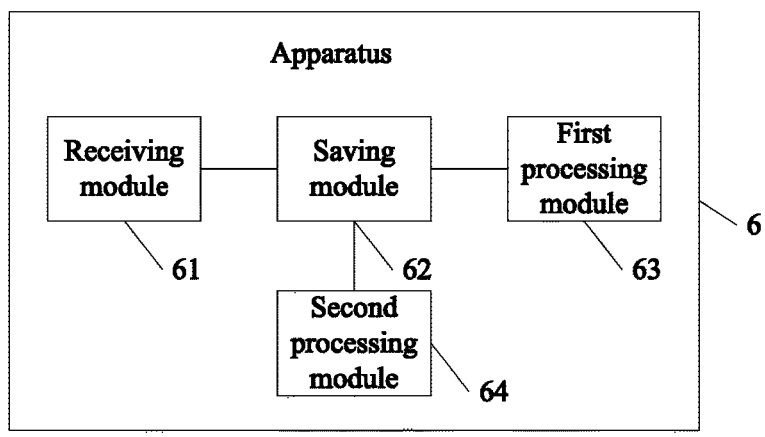
FIG. 6 is a schematic structural diagram of an apparatus for implementing a trunking group call service according to a first embodiment of the present invention.

Refer to FIG. 6 which is a schematic structural diagram of an apparatus 6 for implementing a trunking group call service according to a first embodiment of the present invention, where the apparatus 6 includes a receiving module 61, configured to receive group configuration information and a downlink assignment message and/or an uplink grant message from an evolved cell.

In a process of implementing the trunking group call service, multiple apparatuses are involved. At a same point of time, one of the multiple apparatuses is in a group transmit state, and all remaining apparatuses are in a group receive state. In this embodiment of the present invention, the apparatus for implementing the trunking group call service may be any one of the multiple apparatuses.

The group configuration information received by the receiving module 61 from the evolved cell includes a semi-persistent scheduling period that indicates a time interval for receiving or sending trunking group call service data and a PCI (physical cell identifier) for uniquely identifying the evolved cell. Apparently, the group configuration information further includes a group cell radio network temporary identifier Group C-RNTI used for performing trunking group scheduling and some feedback information.

The receiving module 61 receives the downlink assignment message and/or the uplink grant message from the evolved cell are/is used to correspondingly indicate a downlink resource and/or uplink resource.

Generally, the receiving module 61 receives the group configuration information from the evolved cell first, and after the apparatus 6 saves the received group configuration information, the receiving module 61 receives the downlink assignment message and/or the uplink grant message from the evolved cell.

A saving module 62 is configured to save the group configuration information and the downlink assignment message and/or the uplink grant message received by the receiving module 61. A first processing module 63 is configured to, when the apparatus is in the group receive state at different points of time, receive trunking group call service data by sharing a downlink resource, indicated by the downlink assignment message, with another user equipment in the group in a semi-persistent scheduling manner according to the group configuration information saved by the saving module 62.

At a given point of time, the apparatus for implementing the trunking group call service may be in the group receive state or in the group transmit state. The apparatus in the group receive state does not need to send trunking group call service data and only needs to passively receive trunking group call service data. Therefore, when the apparatus is in the group receive state, the first processing module 63 may receive trunking group call service data according to the downlink resource indicated by the downlink assignment message.

At different points of time, the apparatus for implementing the trunking group call service may be in the group receive state or in the group transmit state. At different points of time, when the apparatus is in the group receive state, the first processing module 63 may receive trunking group call service data according to the downlink resource indicated by the downlink assignment message. For example, at a T1 time point, the apparatus 6 is in the group receive state, and the first processing module 63 receives trunking group call service data by using, in the semi-persistent scheduling manner, the downlink resource F1 indicated by the downlink assignment message. At a T3 time point, the apparatus 6 is in the group receive state again, and the first processing module 63 still can receive trunking group call service data by using, in the semi-persistent scheduling manner, the downlink resource F1 indicated by the downlink assignment message. In other words, as long as the apparatus for implementing the trunking group call service is in the group receive state, the first processing module 63 can receive trunking group call service data by using, in the semi-persistent scheduling manner, the downlink resource indicated by the downlink assignment message.

Because the apparatus is any apparatus in the process of implementing the trunking group call service, and because in the process of implementing the trunking group call service, at a same point of time, apparatuses in the group receive state may share the downlink resource, it may be understood that in the process of implementing the trunking group call service, all apparatuses in the group receive state may share the downlink resource indicated by the downlink assignment message. Alternatively, or in addition, a second processing module 64, configured to, when the apparatus 6 is in the group transmit state at different points of time, send trunking group call service data in a manner in which the user equipment and another user equipment in the group take turns to use an uplink resource, indicated by the uplink grant message, in a semi-persistent scheduling manner according to the group configuration information stored by the saving module 62.

At a same point of time, the apparatus 6 for implementing the trunking group call service may be in the group transmit state or in the group receive state. When the apparatus 6 is in the group transmit state, the second processing module 64 sends trunking group call service data by using, in the semi-persistent scheduling manner, the uplink resource indicated by the uplink grant message. At another point of time, if the apparatus 6 is in the group transmit state, the second processing module 64 still can send trunking group call service data by using, in the semi-persistent scheduling manner, the uplink resource indicated by the uplink grant message. It may be understood that as long as the apparatus 6 is in the group transmit state, the second processing module 64 can send trunking group call service data by using, in the semi-persistent scheduling manner, the uplink resource indicated by the uplink grant message.

Because the apparatus 6 for implementing the trunking group call service is any one in the process of implementing the trunking group call service, and because in the process of implementing the trunking group call service, it is possible that the apparatus in the group transmit state may be different at different points of time, the uplink resource indicated by the uplink grant message is used by apparatuses in the group transmit state in turn.

In this embodiment, if an apparatus for implementing a trunking group call service is in a group receive state at different points of time, the apparatus may share a downlink resource indicated by a downlink assignment message with another apparatus in the group in a semi-persistent scheduling manner according to group configuration information, and/or if an apparatus for implementing a trunking group call service is in a group transmit state at different points of time, the user equipment and another user equipment in the group may take turns to use an uplink resource, indicated by an uplink grant message, in a semi-persistent scheduling manner according to group configuration information. Therefore, an evolved cell does not need to separately and repeatedly configure a downlink resource and/or an uplink resource for apparatuses for implementing the trunking group call service, which reduces a resulting overhead of configuring an instruction and thereby improves resource utilization efficiency for the evolved cell.

Figure 7:
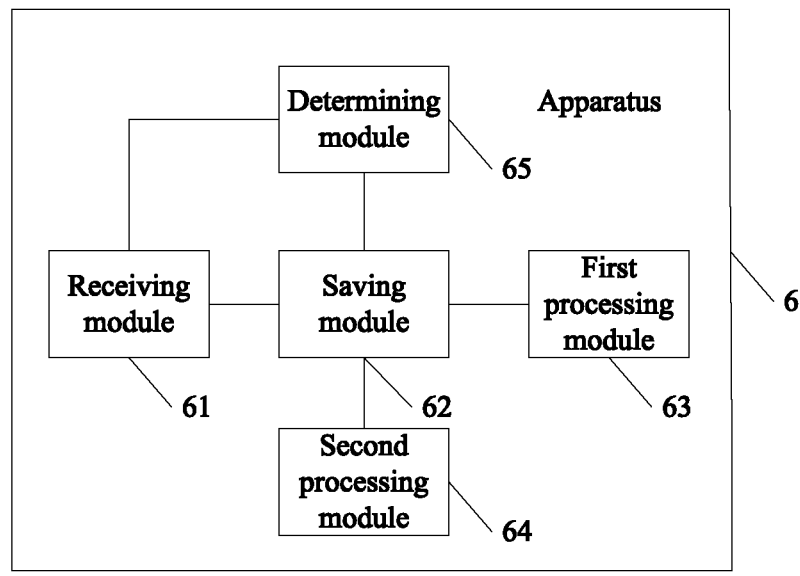
FIG. 7 is a schematic structural diagram of an apparatus for implementing a trunking group call service according to a second embodiment of the present invention.

Refer to FIG. 7 which is a schematic structural diagram of an apparatus for implementing a trunking group call service according to a second embodiment of the present invention. A difference between this embodiment and the embodiment illustrated in FIG. 6 lies in that the apparatus 6 further includes a determining module 65, configured to determine whether the group configuration information received by the receiving module 61 is sent by an evolved cell to which the apparatus belongs.

A reason why it is necessary to determine whether the group configuration information received by the receiving module 61 is sent by the evolved cell to which the apparatus belongs is that: the apparatus for implementing the trunking group call service can use only a downlink resource and/or an uplink resource indicated by the group configuration information sent by the evolved cell to which the apparatus belongs. The evolved cell to which the apparatus for implementing the trunking group call service belongs refers to an evolved cell within a coverage range of which the apparatus is located.

Specifically, the determining module 65 is specifically configured to determine whether a physical cell identifier of the evolved cell to which the apparatus belongs matches a physical cell identifier included in the group configuration information; and if the physical cell identifiers match, determine that the group configuration information is sent by the evolved cell to which the apparatus belongs.

The saving module 62 is specifically configured to: if the determining module 65 determines that the group configuration information is sent by the evolved cell to which the apparatus belongs, save the group configuration information received by the receiving module 61.

Figure 8:
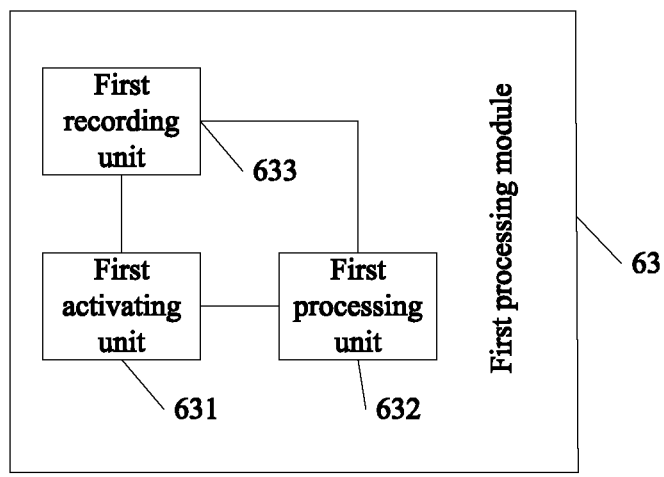
FIG. 8 is a schematic structural diagram of a first processing module illustrated in FIG. 6 according to an embodiment of the present invention.

Refer to FIG. 8 which is a schematic structural diagram of the first processing module 63 in the embodiment of the present invention illustrated in FIG. 6, where the first processing module 63 includes the following. A first activating unit 631 is configured to, when the apparatus is in the group receive state at an initial time point, activate the downlink resource indicated by the downlink assignment message received by the receiving module.

The initial time point refers to a time point at which the apparatus for implementing the trunking group call service receives the downlink resource from the evolved cell.

Specifically, the downlink assignment message sent by the evolved cell is PDCCH signaling that is scrambled by using a Group C-RNTI. After the receiving module 61 of the apparatus 6 receives the downlink assignment message, an operation performed by the apparatus 6 after the downlink assignment message is received varies according to a current state of the apparatus 6.

At the initial time point, if the apparatus 6 is in the group receive state, the first activating unit 631 activates the downlink resource indicated by the downlink assignment message, and controls a first processing unit 632 to receive, according to the downlink resource, trunking group call service data. Because the downlink assignment message may be the PDCCH signaling that is scrambled by using the Group C-RNTI in the group configuration information, the first activating unit 631 further needs to, before activating the downlink resource indicated by the downlink assignment message, descramble the PDCCH signaling by using the Group C-RNTI included in the group configuration information received by the receiving unit 61.

The first processing unit 632 is configured to, after the first activating unit 631 activates the downlink resource, receive trunking group call service data by using the downlink resource. A first recording unit 633 is configured to, when the apparatus is in the group transmit state at the initial time point, record a time point at which a first apparatus activates the downlink resource indicated by the downlink assignment message, where the first user equipment is a user equipment in the group receive state in a process of implementing the trunking group call service.

If the apparatus 6 is in the group transmit state at the initial time point, it indicates that another apparatus for implementing the trunking group call service is in the group receive state at the initial time point and has performed the operation of activating the downlink resource indicated by the downlink assignment message, for example, the first apparatus is in the group receive state and has performed the operation of activating the downlink resource indicated by the downlink assignment message. Therefore, the apparatus needs to record the time point at which the first apparatus activates the downlink resource indicated by the downlink assignment message. Because the apparatus and the first apparatus belong to the same group, the apparatus can learn the time point at which the first apparatus activate the downlink resource.

The first processing unit 632 is further configured to: in a subsequent process of implementing the trunking group call service, when the apparatus is in the group receive state at different points of time, obtain a downlink receiving time according to a semi-persistent scheduling period and the time point, which is recorded by the first recording unit 633 and indicates the time point at which the downlink resource is activated, and receive trunking group call service data according to the downlink assignment message saved by the saving module.

It should be noted that, in a subsequent process of implementing the trunking group call service, when the apparatus is in the group receive state at different points of time, the first processing unit 632 may obtain the downlink receiving time according to the semi-persistent scheduling period and the time point, which is recorded by the first recording unit 633 and indicates the time point at which the downlink resource is activated, and receive trunking group call service data according to the saved downlink assignment message. For example, at the initial time point, the apparatus is in the group transmit state, and the first recording unit 633 of the apparatus records a T2 time point at which the downlink resource is activated; if the apparatus is in the group receive state after two semi-permanent periods, the first processing unit 632 determines, by performing calculation according to the semi-persistent scheduling period T and T2, that the downlink receiving time of the apparatus is 2T+T2, and receives trunking group call service data according to the downlink resource indicated by the stored downlink assignment message.

It may be understood that if the apparatus is in the group receive state at the initial time point, before using the downlink resource, the apparatus needs to activate the downlink resource; if the apparatus is in the group transmit state at the initial time point, the time point at which another apparatus activates the downlink resource needs to be recorded. In a subsequent process of implementing the trunking group call service, if the apparatus is in the group receive state, the apparatus does not need to activate the downlink resource again. In other words, in the whole implementation process of the trunking group call service, the downlink resource needs to be activated only once, and the apparatus can periodically use the downlink resource. Therefore, when the apparatus is in the group receive state at different points of time, the evolved cell does not need to send a downlink assignment message to the apparatus repeatedly, which further reduces an overhead for the evolved cell to configure an instruction, thereby further improving resource utilization efficiency for the evolved cell.

Figure 9:
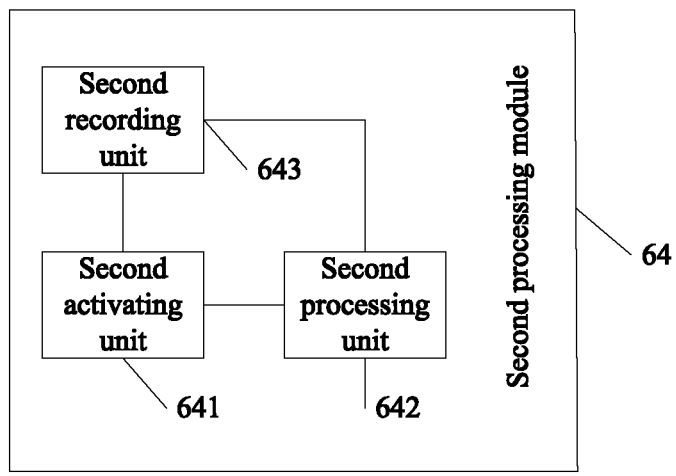
FIG. 9 is a schematic structural diagram of a second processing module illustrated in FIG. 6 according to an embodiment of the present invention.

Refer to FIG. 9 which is a schematic structural diagram of the second processing module 64 in the embodiment of the present invention illustrated in FIG. 6, where the second processing module 64 includes a second activating unit 641, configured to: when the apparatus is in the group transmit state at an initial time point, activate the uplink resource indicated by the uplink grant message.

The initial time point refers to a time point at which the apparatus for implementing the trunking group call service receives the uplink resource from the evolved cell.

Specifically, the uplink grant message sent by the evolved cell is PDCCH signaling that is scrambled by using a Group C-RNTI. After the receiving module 61 of the apparatus receives the uplink grant message, an operation performed by the apparatus after the uplink grant message is received varies according to a current state of the apparatus.

At the initial time point, if the apparatus is in the group transmit state, the second activating unit 641 activates the uplink resource indicated by the uplink grant message, and controls a second processing unit 642 to send, according to the uplink resource, trunking group call service data. Because the uplink grant message may be the PDCCH signaling that is scrambled by using the Group C-RNTI in the group configuration information, the second activating unit 641 further needs to, before activating the uplink resource indicated by the uplink grant message, descramble the PDCCH signaling by using the Group C-RNTI included in the group configuration information received by the receiving unit 61.

The second processing unit 642 is configured to, after the second activating unit 641 activates the uplink resource, send trunking group call service data by using the uplink resource. A second recording unit 643 is configured to, when the apparatus is in the group receive state at the initial time point, record a time point at which a second apparatus activates the uplink resource indicated by the uplink grant message, where the second user equipment is a user equipment in the group transmit state among user equipments of the trunking group call service.

If the apparatus is in the group receive state at the initial time point, it indicates that another apparatus of the trunking group call service is in the group transmit state at the initial time point and has performed the operation of activating the uplink resource indicated by the uplink grant message. For example, the second apparatus is in the group transmit state and has performed the operation of activating the uplink resource indicated by the uplink grant message. Therefore, the apparatus needs to record the time point at which the second apparatus activates the uplink resource indicated by the uplink grant message. Because the apparatus and the second apparatus belong to the same group, the apparatus can learn the time point at which the second apparatus activates the uplink resource.

The second processing unit 642 is further configured to: in a subsequent process of implementing the trunking group call service, when the apparatus is in the group transmit state at different points of time, obtain an uplink sending time according to the semi-persistent scheduling period and the time point, which is recorded by the second recording unit 643 and indicates the time point at which the uplink resource is activated, and send trunking group call service data according to the uplink grant message.

It should be noted that, in a subsequent process of implementing the trunking group call service, when the apparatus is in the group transmit state at different points of time, the second processing unit 642 may obtain an uplink sending moment according to the semi-persistent scheduling period and the time point, which is recorded by the second recording unit 643 and indicates the time point at which the uplink resource is activated, and send trunking group call service data according to the saved uplink grant message. For example, at the initial time point, the apparatus is in the group receive state, and the second recording unit 642 thereof records a T4 time point at which the second apparatus activates the uplink resource; if the apparatus is in the group transmitting state after two semi-permanent periods, the second processing unit 642 obtains, by performing calculation according to the semi-persistent scheduling period T and T4, that the uplink sending of the apparatus is 2T+T4, and sends trunking group call service data according to the uplink resource indicated by the saved uplink grant message.

It may be understood that if the apparatus is in the group transmit state at the initial time point, before using the uplink resource, the apparatus needs to activate the uplink resource; and if the apparatus is in the group receive state at the initial time point, the time point at which another apparatus activates the uplink resource needs to be recorded. In subsequent implementation of the trunking group call service, the apparatus does not need to activate the uplink resource again. In other words, in the whole implementation process of the trunking group call service, the uplink resource needs to be activated only once, and the apparatus in the group transmit state can periodically use the uplink resource. Therefore, when the apparatus is in the group transmit state at different points of time, the evolved cell does not need to send an uplink grant message to the apparatus repeatedly, which further reduces an overhead for the evolved cell to configure an instruction, thereby further improving resource utilization efficiency for the evolved cell.

The apparatus 6, the first apparatus, and the second apparatus may all be a user equipment, such as a device like a mobile phone.

Figure 10:
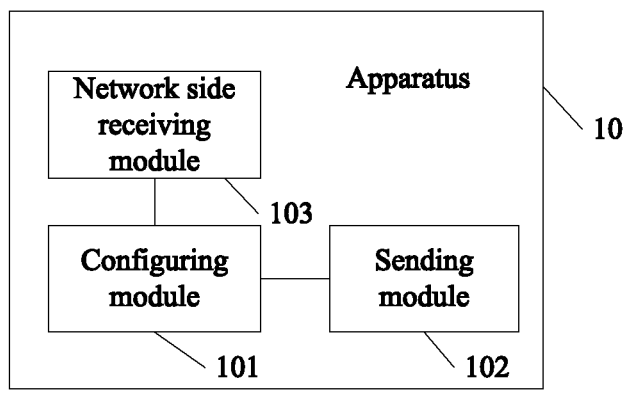
FIG. 10 is a schematic structural diagram of an apparatus for implementing a trunking group call service according to a third embodiment of the present invention.

Refer to FIG. 10 which is a schematic structural diagram of an apparatus 10 for implementing a trunking group call service according to a third embodiment of the present invention, where the apparatus 10 includes a configuring module 101, adapted to configure group configuration information and a downlink assignment message and/or an uplink grant message for a user equipment of a trunking group call service in the evolved cell, where the downlink assignment message indicates a downlink resource that the user equipment, which is in a group receive state at different points of time, shares with another user equipment in the group in a semi-persistent scheduling manner and the uplink grant message indicates an uplink resource that the user equipment, which is in a group transmit state at different points of time, and another user equipment in the group take turns to use in the semi-persistent scheduling manner.

The group configuration information configured by the configuring module 101 includes a semi-persistent scheduling period that indicates a time interval for receiving or sending trunking group call service data, a physical cell identifier for uniquely identifying the evolved cell, and a group cell radio network temporary identifier Group C-RNTI used for performing trunking group scheduling.

A sending module 102 is configured to send the group configuration information and the downlink assignment message and/or the uplink grant message configured by the configuring module 101 to the user equipment of the trunking group call service.

Generally, the sending module 102 sends the group configuration information to the user equipment of the trunking group call service first, and after the user equipment of the trunking group call service receives the group configuration information, sends the downlink assignment message and/or the uplink grant message to the user equipment.

Specifically, the sending module 102 is configured to send a trunking group call notification message to the user equipment of the trunking group call service in a form of a paging message or a form of a new common control message, where the trunking group call notification message carries the group configuration information.

In the whole process of implementing the trunking group call service, the sending module 102 sends the downlink assignment message and/or the uplink grant message only once, where the downlink assignment message and/or the uplink grant message are/is scrambled by using the group cell radio network temporary identifier Group C-RNTI that is used for performing trunking group call scheduling and included in the group configuration information.

Specifically, the downlink assignment message may be PDCCH signaling that is scrambled by using the Group C-RNTI.

The sending module 102 is further configured to: in a subsequent process of implementing the trunking group call service, send trunking group call service data to a user equipment in the group receive state according to a time point at which the downlink resource is activated and according to the semi-persistent scheduling period configured by the configuring module 101, where the time point at which the downlink resource is activated is a time point at which a user equipment that is in the group receive state at an initial time point activates the downlink resource. The initial time point specifically is a time point at which an apparatus for implementing the trunking group call service sends the downlink assignment message to a user equipment of the trunking group call service.

Because the apparatus configures the downlink resource that is scheduled in the semi-persistent scheduling manner, in the whole process of implementing the trunking group call service, the apparatus needs to send the downlink assignment message to a user equipment of the trunking group call service only once. In a subsequent process of implementing the trunking group call service, the apparatus sends trunking group call service data to a user equipment in the group receive state according to the time point at which the downlink resource is activated and according to the semi-persistent scheduling period configured by the configuring module 101. Therefore, the apparatus does not need to separately and repeatedly send the downlink assignment message to a user equipment in the group receive state at different points of time, which reduces an overhead for the evolved cell to configure an instruction, thereby further improving resource utilization efficiency for the evolved cell.

Further, the apparatus 10 further includes a network side receiving module 103, configured to: in a subsequent process of implementing the trunking group call service, receive, according to a time point at which the uplink resource is activated and according to the semi-persistent scheduling period configured by the configuring module 101, trunking group call service data sent by a user equipment in the group transmit state.

An initial time point specifically is a time point at which the apparatus 10 sends the uplink grant message to a user equipment of the trunking group call service, where the time point at which the uplink resource is activated is a time point at which a user equipment that is in the group transmit state at the initial time point activates the uplink resource.

Because the apparatus 10 configures the uplink resource that is scheduled in the semi-persistent scheduling manner, in the whole process of implementing the trunking group call service, the apparatus needs to send the uplink grant message to a user equipment of the trunking group call service only once. In a subsequent process of implementing a trunking group call service, the apparatus receives, according to the time point at which the uplink resource is activated and according to the semi-persistent scheduling period configured by the configuring module 101, trunking group call service data sent by a user equipment in the group transmit state. Therefore, the apparatus does not need to separately and repeatedly send the uplink grant message to a user equipment in the group transmit state at different points of time, which reduces an overhead for the evolved cell to configure an instruction, thereby further improving resource utilization efficiency for the evolved cell.

In this embodiment, a downlink resource configured by an apparatus 10 indicates a downlink resource that is shared in a semi-persistent scheduling manner by user equipments of a trunking group call service in a group receive state, and/or a configured uplink grant message indicates a uplink resource that user equipments of a trunking group call service in a group transmit state take turns to use in a semi-persistent scheduling manner. Therefore, the apparatus does not need to separately and repeatedly configure a downlink resource and/or an uplink resource for user equipments in a group, which reduces a resulting overhead of configuring an instruction and thereby improves resource utilization efficiency for the evolved cell.

The apparatus 10 may be a network entity such as a base station.

The foregoing describes the embodiments provided by the present invention in detail. Specific examples are used in this specification to describe the principle and embodiments of the present invention. The descriptions of the foregoing embodiments are merely intended to help understand the methods of the present invention and core idea of the present invention. In addition, with respect to the specific implementation manners and the application scope, modifications may be made by a person of ordinary skill in the art according to the idea of the present invention. Therefore, the specification shall not be construed as a limitation on the present invention.

What is claimed is:

1. A method for implementing a trunking group call service, the method comprising:
receiving, by a user equipment of the trunking group call service, group configuration information and at least one of a downlink assignment message and an uplink grant message from an evolved cell;
saving, by the user equipment of the trunking group call service, the group configuration information and at least one of the downlink assignment message and the uplink grant message; and
performing, by the user equipment, at least one of:
receiving, in response to the user equipment of the trunking group call service being in a group receive state at different points of time, trunking group call service data by sharing a downlink resource, indicated by the downlink assignment message, with another user equipment in the group in a semi-persistent scheduling manner according to the group configuration information; and sending, in response to the user equipment of the trunking group call service being in a group transmit state at different points of time, trunking group call service data by using in turn, an uplink resource, indicated by the uplink grant message, in a semi-persistent scheduling manner according to the group configuration information;

wherein the semi-persistent scheduling manner is a scheduling manner in which a scheduled time-and-frequency resource is scheduled and activated once for the user equipment according to the group configuration information and the user equipment periodically performs the at least one of the sending and receiving service data by using the same scheduled time-and-frequency resource at a fixed interval; and wherein a configuration for the user equipment of the downlink resource and the uplink resource is maintained during a transition between the group receive state and the group transmit state.

2. The method according to claim 1, wherein the group configuration information comprises a semi-persistent scheduling period that indicates a time interval for receiving or sending trunking group call service data and a physical cell identifier for uniquely identifying the evolved cell.

3. The method according to claim 2, wherein before the saving, the method further comprises:

determining, by the user equipment of the trunking group call service and according to a physical cell identifier (PCI) in the group configuration, whether the group configuration information is sent by an evolved cell to which the user equipment of the trunking group call service belongs; and if the group configuration information is sent by an evolved cell to which the user equipment of the trunking group call service belongs, saving, by the user equipment of the trunking group call service, the group configuration information.

4. The method according to claim 3, wherein determining whether the group configuration information is sent by an evolved cell to which the user equipment of the trunking group call service belongs comprises:

determining, by the user equipment of the trunking group call service, whether a physical cell identifier of the evolved cell to which the user equipment of the trunking group call service belongs matches the physical cell identifier comprised in the group configuration information and if the physical cell identifiers match, determining that the group configuration information is sent by the evolved cell to which the user equipment of the trunking group call service belongs.

5. The method according to claim 2, wherein the receiving comprises:

if the user equipment of the trunking group call service is in the group receive state at an initial time point, activating the downlink resource indicated by the downlink assignment message, and receiving trunking group call service data by using the downlink resource; and if the user equipment of the trunking group call service is in the group transmit state at the initial time point, recording a time point at which a first user equipment activates the downlink resource indicated by the downlink assignment message, wherein the first user equipment is a user equipment in the group receive state in a process of implementing the trunking group call service and, in a subsequent process of implementing the trunking group call service, when the user equipment of the trunking group call service is in the group receive state at different points of time, obtaining a downlink receiving time according to the semi-persistent scheduling period and the recorded time point at which the downlink resource is activated, and receiving trunking group call service data according to the saved downlink assignment message.

6. The method according to claim 2, wherein the sending comprises:

if the user equipment of the trunking group call service is in the group transmit state at an initial time point, activating the uplink resource indicated by the uplink grant message, and sending trunking group call service data by using the uplink resource; and if the user equipment of the trunking group call service is in the group receive state at the initial time point, recording a time point at which a second user equipment activates the uplink resource indicated by the uplink grant message, wherein the second user equipment is a user equipment in the group transmit state among user equipments of the trunking group call service; and, in a subsequent process of implementing the trunking group call service, when the user equipment of the trunking group call service is in the group transmit state at different points of time, obtaining an uplink sending time according to the semi-persistent scheduling period and the recorded time point at which the uplink resource is activated, and sending trunking group call service data according to the saved uplink grant message.

7. A method for implementing a trunking group call service, comprising:

configuring, by an evolved cell, group configuration information and at least one of a downlink assignment message and an uplink grant message for a user equipment of the trunking group call service in the evolved cell, wherein the downlink assignment message indicates a downlink resource that the user equipment, which is in a group receive state at different points of time, shares with another user equipment in the group in a semi-persistent scheduling manner and the uplink grant message indicates an uplink resource that the user equipment, which is in a group transmit state at different points of time, and another user equipment in the group take turns to use in the semi-persistent scheduling manner, wherein a configuration for the user equipment of the downlink resource and the uplink resource is maintained during a transition between the group receive state and the group transmit state, wherein uplink resource and the downlink resources are scheduled time-and-frequency resources, and wherein the semi-persistent scheduling manner is a scheduling manner in which the scheduled time-and-frequency resources is scheduled and activated once for the user equipment according to the group configuration information and the user equipment periodically performs at least one of sending and receiving service data by using a same scheduled time-and-frequency resource at a fixed interval; and sending, by the evolved cell, the group configuration information and at least one of the downlink assignment message and the uplink grant message to the user equipment of the trunking group call service.

8. The method according to claim 7, wherein the group configuration information comprises a semi-persistent scheduling period that indicates a time interval for receiving or sending trunking group call service data, a physical cell identifier for uniquely identifying the evolved cell, and a group cell radio network temporary identifier Group C-RNTI used for performing trunking group scheduling.

9. The method according to claim 7, wherein the sending comprises sending, by the evolved cell, a trunking group call notification message to the user equipment of the trunking group call service in a form of a paging message or a form of a new common control message, wherein the trunking group call notification message carries the group configuration information.

10. The method according to claim 7, wherein in a whole process of implementing the trunking group call service, the evolved cell sends the at least one of the downlink assignment message and the uplink grant message only once, wherein the at least one of the downlink assignment message and uplink grant message is separately scrambled by using the group cell radio network temporary identifier Group C-RNTI that is used for performing trunking group scheduling and is in the group configuration information.

11. An apparatus for implementing a trunking group call service, the apparatus comprising:
  a receiving module, configured to receive group configuration information and at least one of a downlink assignment message and an uplink grant message from an evolved cell;
  a saving module, configured to save the group configuration information and the at least one of the downlink assignment message and the uplink grant message received by the receiving module;
  a processing module, configured to perform at least one of:
    when the apparatus is in a group receive state at different points of time, receive trunking group call service data by sharing a downlink resource, indicated by the downlink assignment message, with another user equipment in the group in a semi-persistent scheduling manner according to the group configuration information saved by the saving module; and
    when the apparatus is in a group transmit state at different points of time, send trunking group call service data in a manner in which the user equipment and another user equipment in the group take turns to use an uplink resource, indicated by the uplink grant message, in a semi-persistent scheduling manner according to the group configuration information saved by the saving module;
  wherein the semi-persistent scheduling manner is a scheduling manner in which a scheduled time-and-frequency resource is scheduled and activated once for the apparatus according to the group configuration information and the apparatus periodically performs the at least one of the sending and receiving service data by using the same scheduled time-and-frequency resource at a fixed interval; and
  wherein a configuration for the user equipment of the downlink resource and the uplink resource is maintained during a transition between the group receive state and the group transmit state.

12. The apparatus according to claim 11, wherein the group configuration information received by the receiving module comprises a semi-persistent scheduling period that indicates a time interval for receiving or sending trunking group call service data and a physical cell identifier for uniquely identifying the evolved cell.

13. The apparatus according to claim 12, wherein the apparatus further comprises:
  a determining module, configured to determine whether the group configuration information received by the receiving module is sent by an evolved cell to which the apparatus belongs;
  wherein the saving module is specifically configured to, if the determining module determines that the group configuration information is sent by the evolved cell to which the apparatus belongs, save the group configuration information received by the receiving module.

14. The apparatus according to claim 13, wherein the determining module is specifically configured to determine whether a physical cell identifier of the evolved cell to which the apparatus belongs matches the physical cell identifier comprised in the group configuration information and, if the physical cell identifiers match, to determine that the group configuration information is sent by the evolved cell to which the apparatus belongs.

15. The apparatus according to claim 14, wherein the processing module comprises:
  a first activating unit, configured to, when the apparatus is in the group receive state at an initial time point, activate the downlink resource indicated by the downlink assignment message received by the receiving module;
  a first processing unit, configured to, after the first activating unit activates the downlink resource, receive trunking group call service data by using the downlink resource; and
  a first recording unit, configured to, when the apparatus is in the group transmit state at the initial time point, record a time point at which a first user equipment activates the downlink resource indicated by the downlink assignment message, wherein the first user equipment is a user equipment in the group receive state in a process of implementing the trunking group call service;
  wherein the processing unit is further configured to, in a subsequent process of implementing the trunking group call service, when the apparatus is in the group receive state at different points of time, obtain a downlink receiving time according to the semi-persistent scheduling period and the time point, which is recorded by the first recording unit and indicates the time point at which the downlink resource is activated, and to receive trunking group call service data according to the downlink assignment message saved by the saving module.

16. The apparatus according to claim 14, wherein the processing module comprises:
  a second activating unit, configured to, when the apparatus is in the group transmit state at an initial time point, activate the uplink resource indicated by the uplink grant message;
  a second processing unit, configured to, after the second activating unit activates the uplink resource, send trunking group call service data by using the uplink resource; and
  a second recording unit, configured to, when the apparatus is in the group receive state at the initial time point, record a time point at which a second user equipment activates the uplink resource indicated by the uplink grant message, wherein the second user equipment is a user equipment in the group transmit state in a process of implementing the trunking group call service;

wherein the processing unit is further configured to, in a subsequent process of implementing the trunking group call service, when the apparatus is in the group transmit state at different points of time, obtain an uplink sending time according to the semi-persistent scheduling period and the time point, which is recorded by the second recording unit and indicates the time point at which the uplink resource is activated, and send trunking group call service data according to the uplink grant message.

17. An apparatus for implementing a trunking group call service, comprising:

a configuring module, configured to configure group configuration information and at least one of a downlink assignment message and an uplink grant message for a user equipment of a trunking group call service in the evolved cell, wherein the downlink assignment message indicates a downlink resource that the user equipment, which is in a group receive state at different points of time, shares with another user equipment in the group in a semi-persistent scheduling manner and the uplink grant message indicates an uplink resource that the user equipment, which is in a group transmit state at different points of time, and another user equipment in the group take turns to use in the semi-persistent scheduling manner, wherein a configuration for the user equipment of the downlink resource and the uplink resource is maintained during a transition between the group receive state and the group transmit state, wherein uplink resource and the downlink resources are scheduled time-and-frequency resources, and wherein the semi-persistent scheduling manner is a scheduling manner in which the scheduled time-and-frequency resources is scheduled and activated once for the apparatus according to the group configuration information and the apparatus periodically performs at least one of sending and receiving service data by using a same scheduled time-and-frequency resource at a fixed interval; and a sending module, configured to send the group configuration information and the at least one of the downlink assignment message and the uplink grant message configured by the configuring module to of the trunking group call service.

18. The apparatus according to claim 17, wherein the group configuration information configured by the configuring module comprises a semi-persistent scheduling period that indicates a time interval for receiving or sending trunking group call service data, a physical cell identifier for uniquely identifying the evolved cell, and a group cell radio network temporary identifier Group C-RNTI used for performing trunking group scheduling.

19. The apparatus according to claim 18, wherein in a whole process of implementing the trunking group call service, the sending module sends the at least one of the downlink assignment message and the uplink grant message only once, wherein the at least one of the downlink assignment message and the uplink grant message are/is scrambled by using the group cell radio network temporary identifier Group C-RNTI that is used for performing trunking group scheduling and included in the group configuration information.

20. The apparatus according to claim 17, wherein the sending module is specifically configured to send a trunking group call notification message to the user equipment of the trunking group call in a form of a paging message or a form of a new common control message, wherein the trunking group call notification message carries the group configuration information.

* * * * *